United States Patent
Appelman et al.

(10) Patent No.: US 6,670,429 B2
(45) Date of Patent: Dec. 30, 2003

(54) BLOCK COPOLYESTER

(75) Inventors: Eric Appelman, Dordrecht (NL); Jeffrey Thomas Carter, Marton (GB)

(73) Assignee: Imperial Chemical Industries PLC, London (GB)

(*) Notice: Subject to any disclaimer, the term of this patent is extended or adjusted under 35 U.S.C. 154(b) by 52 days.

(21) Appl. No.: 10/331,346

(22) Filed: Dec. 31, 2002

(65) Prior Publication Data

US 2003/0105273 A1 Jun. 5, 2003

Related U.S. Application Data

(63) Continuation of application No. PCT/EP01/07016, filed on Jun. 21, 2001.

(30) Foreign Application Priority Data

Jul. 3, 2000 (EP) .............................. 00305598

(51) Int. Cl.$^7$ ................................ C08F 20/00
(52) U.S. Cl. ................. 525/444.5; 528/295.3; 528/302; 528/308; 528/308.6; 528/298; 525/444
(58) Field of Search ............... 528/295.3, 302, 528/308, 308.6; 525/444, 444.5

(56) References Cited

U.S. PATENT DOCUMENTS

| | | | |
|---|---|---|---|
| 4,031,165 A | 6/1977 | Saiki et al. | |
| 6,046,302 A | * 4/2000 | Buning et al. | 528/272 |

FOREIGN PATENT DOCUMENTS

| | | | |
|---|---|---|---|
| EP | 0013461 A1 | 7/1980 | |
| EP | 1170319 | * 1/2002 | |
| JP | 48000991 A | 5/1971 | |
| JP | 11080336 A2 | 9/1997 | |

OTHER PUBLICATIONS

El Fray et al. "Synthesis and Properties of Multiblock Ester–Aliphatic–Ether Terpolymers" *KGK Kautschuk Gummi Kunststoffe* 49:10 (Oct. 1, 1996) 692–697.

Manuel et al. "Segmented block copolymers based on dimerized fatty acids and poly(butylene terephthalate)" *Polymer* 34:3 (1993) 636–641.

Manuel et al. "Segmented block copolymers based on poly(butylene terephthalate) and telechelic polyesters and polyamides of dimerized fatty acids" *Polymer* 34:20 (1993) 4325–4329.

Fakirov et al. "Poly(ether/ester)s based on poly(butylene terephthalate) and poly(ethylene glycol), 2 a)—Effect of polyether segment length" *Makromolekulare Chemie* 191 (Mar. 1990) 615–624.

* cited by examiner

*Primary Examiner*—Samuel A. Acquah
(74) *Attorney, Agent, or Firm*—Pillsbury Winthrop LLP

(57) ABSTRACT

A block copolyester comprises a hard segment and a soft segment, wherein the melting point of the copolyester is greater than or equal to 200° C., and the glass transition temperature of the copolyester is less than or equal to −40° C. The hard segment is preferably polyethylene terephthalate, polybutylene terephthalate, or polyethylene naphthalate. The soft segment is preferably formed from at least one dimer fatty acid and/or dimer fatty diol and/or equivalent thereof. The copolyester is especially suitable for use in automotive parts, particularly where thermal stability is required.

10 Claims, No Drawings

BLOCK COPOLYESTER

CROSS REFERENCE TO RELATED APPLICATION

This application is a continuation of International Application No. PCT/EP01/07016, filed Jun. 21, 2001. This application, in its entirety, is incorporated herein by reference.

FIELD OF INVENTION

The present invention relates to a copolyester, and in particular to a block copolyester.

BACKGROUND

A known category of thermoplastic elastomers is polyester elastomers, which can be used in a wide range of applications such as in tubes, belts, or molded articles, made for example by injection molding. Such polyester elastomers normally contain a rigid, crystalline polyester (or "hard" segment), usually an aromatic polyester such as polyethylene terephthalate (PET) or polybutylene terephthalate (PBT), which is modified with a non-crystalline material (or "soft" segment). The hard, crystalline segments are chemically linked with the soft, non-crystalline segments in a single polymeric chain. In this material, the hard segments congregate to form crystalline areas that provide strength and hardness to the material. Similarly, the soft segments congregate in a separate phase, and provide flexibility to the material. PBT is the most commonly used hard segment, because of its ease of crystallization. The soft segment is normally a polyether such as polytetramethylene glycol (PTMEG), polyethyleneglycol (PEG), polypropylene glycol (PPG), or ethylene oxide/propylene oxide block copolymers. The disadvantages of polyethers include their sensitivity to heat, oxidation and UV. Alternative soft segments include aliphatic polyesters such as adipate ester or polycaprolactone, which can be sensitive to hydrolysis. In addition, transesterification tends to occur during synthesis, which results in break up of the hard and/or soft segments with a consequential loss of the required properties. In particular, there is a requirement for a copolyester which possesses both high melting point and low glass transition point.

REVIEW OF THE PRIOR ART

U.S. Pat. No. 4,031,165-A claims a process of making block copolyesters in the presence of a titanium-type catalyst and a phosphorus compound.

GB-2203425-A is directed to dimerised fatty acids and describes forming polyesters using such dimerised fatty acids. The polyesters produced according to the teaching of GB-2203425-A are homo polyesters or random copolyesters.

JP-11080336-A discloses a copolyester having a non-crystalline part formed from dimer acid, terephthalic acid and polyoxyethylene glycol, and a crystalline part formed from butylene terephthalate.

SUMMARY OF THE INVENTION

We have now surprisingly discovered a block copolyester which reduces or substantially overcomes at least one of the aforementioned problems.

Accordingly, the present invention provides a block copolyester comprising a hard segment and a soft segment wherein the melting point of the copolyester is greater than or equal to 200° C., and the glass transition temperature of the copolyester is less than or equal to −40° C.

The invention also provides a block copolyester comprising a hard segment and a soft segment wherein the melting point of the copolyester is less than 20° C. lower than the melting point of the hard segment, and the glass transition temperature of the copolyester is less than 20° C. higher than the glass transition temperature of the soft segment.

The invention further provides a method of preparing a block copolyester as defined herein wherein the soft segment is formed in situ, in the presence of the preformed hard segment, and the same diol is used to form both the hard and soft segments.

The composition of the polyester hard segment may vary over a wide range. The polyester is preferably an aromatic polyester. Suitable aromatic dicarboxylic acids, and/or ester derivatives thereof, for use in forming the hard segment, include terephthalic acid, isophthalic acid, naphthalene dicarboxylic acid, diphenyl dicarboxylic acid, or mixtures thereof. Terephthalic acid, and/or ester derivative thereof, is particularly preferred. The hard segment is preferably formed from greater than 50, more preferably greater than 70, particularly greater than 90, and especially greater than 95 and up to 100 mole % of aromatic dicarboxylic acid(s) and/or ester derivatives thereof. The balance (up to 100 mole %) of dicarboxylic acids (if any) can be suitably made up of aliphatic dicarboxylic acids, such as adipic acid, sebacic acid, or cyclohexane dicarboxylic acid.

Suitable diols or glycols for use in forming the hard segment include aliphatic diols such as ethylene glycol, 1,3-propylene glycol, 1,4-butanediol, 1,6-hexanediol, neopentyl glycol, trimethylene glycol, tetramethylene glycol, and cyclohexane dimethanol, or aromatic diols such as 2,2-bis(4-hydroxyphenyl)propane. The hard segment is preferably formed from greater than 50, more preferably greater than 70, particularly greater than 90, and especially greater than 95 and up to 100 mole % of aliphatic glycol(s), preferably ethylene glycol and/or 1,4-butanediol.

In a particularly preferred embodiment of the invention, the hard segment is polybutylene terephthalate, polyethylene terephthalate, polyethylene naphthalate or mixtures thereof, and especially polybutylene terephthalate.

The hard segment preferably has a molecular weight number average in the range from 1000 to 30,000, more preferably 2,000 to 15,000, particularly 2,500 to 10,000, and especially 3,000 to 5,000.

The hard segment preferably has a melting point (Tm) in the range from 200 to 280° C., more preferably 210 to 270° C., particularly 215 to 255° C., and especially 220 to 230° C.

The polyester soft segment is preferably an aliphatic polyester. The polyester is preferably formed from a dimer fatty acid and/or ester derivative thereof and/or dimer fatty diol.

The term dimer fatty acid is well known in the art and refers to the dimerisation product of mono- or polyunsaturated fatty acids. Preferred dimer acids are dimers of $C_{10}$ to $C_{30}$, more preferably $C_{12}$ to $C_{24}$, particularly $C_{14}$ to $C_{22}$, and especially $C_{18}$ alkyl chains. Consequently, preferred dimer acids comprise in the range from 20 to 60, more preferably 24 to 48, particularly 28 to 44, and especially 36 carbon atoms. Suitable dimer fatty acids include the dimerisation products of oleic acid, linoleic acid, linolenic acid, palmitoleic acid, elaidic acid, or erucic acid. The dimerisation products of the unsaturated fatty acid mixtures obtained in the hydrolysis of natural fats and oils, e.g. sunflower oil, soybean oil, olive oil, rapeseed oil, cottonseed oil and tall oil, may also be used.

In addition to the dimer fatty acids, dimerisation usually results in varying amounts of oligomeric fatty acids (so-called "trimer") and residues of monomeric fatty acids (so-called "monomer"), or esters thereof, being present. The amount of momomer can, for example, be reduced by distillation. Particularly preferred dimer fatty acids have a dicarboxylic (or dimer) content of greater than 95%, more preferably greater than 97.5%, particularly greater than 98.5%, and especially greater than 99.0% by weight.

The soft segment is preferably formed from greater than 50, more preferably greater than 70, particularly greater than 90, and especially greater than 95 and up to 100 mole % of dimer fatty acids and/or ester derivatives thereof. The balance (up to 100 mole %) of dicarboxylic acids (if any) can be suitably made up of non-dimeric fatty dicarboxylic acids and/or ester derivatives thereof. Preferred materials are linear dicarboxylic acids having terminal carboxyl groups having a carbon chain of from 6 to 20, more preferably 8 to 12 carbon atoms, such as adipic acid, pimelic acid, suberic acid, azelaic acid, sebacic acid, heptane dicarboxylic acid, octane dicarboxylic acid, nonane dicarcoxylic acid, decane dicarboxylic acid, undecane dicarboxylic acid, dodecane dicarboxylic acid and higher homologs thereof.

Suitable diols include those mentioned above, and at the same concentration ranges, for forming the hard segment. Alternatively, dimer fatty diols may be used, which can be produced by hydrogenation of the corresponding dimer acid. Thus, the soft segment is preferably formed from greater than 25, more preferably greater than 35, particularly greater than 45, and especially greater than 47.5 and up to 50 mole % of dimer fatty acids or dimer fatty alcohols, or a mixture thereof, based on the total amount of dicarboxylic acids and/or ester derivatives thereof, and diols used to form the soft segment.

The soft segment of the copolyester according to the present invention preferably comprises at least one, more preferably in the range from 1 to 20, more preferably 1 to 15, particularly 2 to 10, and especially 2 to 5 ester bonds.

The soft segment preferably has a glass transition temperature (Tg) in the range from −80 to −40° C., more preferably −75 to −45° C., particularly −70 to −50° C., and especially −65 to −55° C.

The soft segment preferably has a molecular weight number average in the range from 500 to 7,500, more preferably 700 to 5,000, particularly 900 to 2,500, and especially 1,000 to 1,500.

The ratio of hard to soft segment present in the block copolyester is preferably in the range from 1 to 20:1, more preferably 2 to 15:1, particularly 3 to 10:1, and especially 4 to 6:1 by weight %.

The block copolyester preferably comprises in the range from 1 to 35, more preferably 2 to 20, particularly 3 to 10, and especially 4 to 6 separate blocks of both hard and soft segment. The copolyester preferably has a molecular weight number average in the range from 5,000 to 100,000, more preferably 15,000 to 80,000, particularly 25,000 to 60,000, and especially 30,000 to 40,000.

The block copolyester preferably comprises greater than 90, more preferably greater than 95, particularly greater than 98, and especially consists essentially of 100 weight % of the hard and soft polyester blocks as defined herein. Thus, the block copolyester according to the present invention may comprise small amounts of other materials (for example other than the dicarboxylic acids and diols as disclosed herein), preferably less than 10, more preferably less than 5, and especially less than 2 weight % of non-polyester materials, such as polyethers.

The block copolyester preferably has a melting point (Tm) in the range 200 to 280° C., more preferably 210 to 265° C., particularly 215 to 245° C., and especially 220 to 225° C. In a particularly preferred embodiment of the invention, the melting point of the copolyester is suitably less than 20° C., preferably less than 15° C., more preferably less than 10° C., particularly less than 8° C., and especially less than 5° C. lower than the melting point of the hard segment. By melting point of the hard segment is meant the melting point of the isolated component of the hard segment, for example such a component having a molecular weight number average of greater than or equal to approximately 10,000. Thus, where the hard segment is formed from butylene terephthalate, the melting point of the hard segment, ie polybutylene terephthalate is 225° C.

The block copolyester preferably has a glass transition temperature (Tg) in the range from −80 to −40° C., more preferably −70 to −45° C., particularly −65 to −50° C., and especially −60 to −55° C. In a particularly preferred embodiment of the invention, the glass transition temperature of the copolyester is suitably less than 20° C., preferably less than 12° C., more preferably less than 10° C., particularly less than 7° C., and especially less than 4° C. higher than the glass transition temperature of the soft segment. By glass transition temperature of the soft segment is meant the glass transition temperature of the isolated component of the soft segment. Thus, where the soft segment is formed from $C_{36}$ dimer fatty acid (and, for example, 1,4-butanediol), the glass transition temperature of the soft segment is −60° C.

The block copolyester according to the present invention may be produced by pre-forming the hard segment, and forming the soft segment in situ in the presence of the hard segment. The aforementioned method is particularly advantageous when the same diol is used to form both the hard and soft segments, especially where the hard segments are polybutylene terephthalate, i.e. 1,4-butane diol is used to form both the hard and soft segments. Alternatively, the block copolyester may also be prepared by pre-forming both the hard and soft segments, and then reacting them together, for example via the reactive extrusion of the homopolymers of both the hard and soft segments. The resulting block copolyester may be further polymerised by solid state polymerisation (SSP) in order to increase the molecular weight of the copolyester.

The degree of blockiness can be expressed by measuring the % transesterification, as described herein, and a block copolyester according to the present invention preferably has a % transesterification of less than 75%, more preferably in the range from 15 to 65%, particularly 25 to 55%, and especially 30 to 45%.

The block copolyester suitably has a thermal stability, measured as described herein, of greater than 65% preferably greater than 75%, more preferably greater than 80%, particularly greater than 85%, and especially greater than 90%, and up to 100%, retention of elongation after heating at 150° C. in air for 2000 hours.

The block copolyester suitably has a hydrolytic stability, measured as described herein, of greater than 65%, preferably greater than 75%, more preferably greater than 80%, particularly greater than 85%, and especially greater than 90%, and up to 100%, retention of elongation after heating in boiling water for 600 hours.

The block copolyester described herein may be used in a wide range of applications where thermoplastic elastomers are normally used, such as bearings and seals, belts, boots and bellows, coiled tubing, reinforced housing, electric cables, electric switches for appliances, and all types of automotive parts. The block copolyester is particularly suitable for use in applications where a good thermal/oxidative stability is required, such as under-the-bonnet applications in the automotive industry, like cables and constant velocity joint boots for cars. The block copolyesters according to the present invention provide improved heat stability and high melting points.

The invention is illustrated by the following non-limiting examples.

EXAMPLES

In this specification the following test methods have been used.

(i) The glass transition temperature (Tg) was measured by Differential Scanning Calorimetry (DSC) using a Mettler DSC30.

(ii) Molecular weight number average was determined by Gel Permeation Chromatography (GPC).

(iii) 1H NMR spectrum of the copolyester was produced using a JEOL GSX 400 MHz Solution State NMR. The concentrations of hard segment and soft segment in the copolymer were determined from their relevant peaks, and the information used to calculate the theoretical values for the resonances of neighbouring dicarboxylixc acids and glycols assuming that the copolymer was completely random. The actual values for the resonances of neighbouring dicarboxylixc acids and glycols was measured from the spectrum, and expressed as a percentage of the theoretical values for a random copolymer. This value is called the % transesterification of the copolymer, i.e. 100% is completely random, and the lower the % value, the less random and greater the blockiness of the copolymer.

(iv) The thermal stability of the block copolyester was determined by heating the copolyester at 150° C. in air for 2000 hours, and then measuring the % retention of elongation, according to ASTM D-412.

(v) The hydrolytic stability of the block copolyester was determined by heating the copolyester in boiling water for 600 hours, and then measuring the % retention of elongation, according to ASTM D-412.

Example 1

(i) Synthesis of Butylene Terephthalate Monomer 474 g of dimethyl terephthalate and 660 g of 1,4-butanediol were placed into a 2 liter round bottomed flack fitted with a condenser, vigreux distillation column, nitrogen inlet and mechanical stirrer. The reactor was placed inside an isomantle and slowly heated to a temperature of 160° C. At this point 248 mg of tetrabutyl titanate catalyst pre-mixed with a small amount of pure 1,4-butanediol was injected, whilst the reactor contents were being stirred. The reaction was allowed to continue for 1 hour at 200° C. Methanol vapor which is produced during the reaction, was removed via the vigreux distillation column and combined condenser. The composition of the product was 82% by weight of butylene terephthalate (as confirmed by NMR) and 18% by weight of 1,4-butanediol.

(ii) Synthesis of PBT Hard Segment/Block Copolyester 100 g of the butylene terephthalate produced above was placed into a columnar shaped reaction vessel fitted with a vacuum pump and nitrogen inlet, and heated to 200° C. Vacuum was applied and steadily increased to 1 mbar in order to reduce the residual 1,4-butanediol present with the butylene terephthalate. The vacuum was taken off when 90% of the residual 1,4-butanediol had been removed. The nitrogen flow was applied and 50 ppm of titanium in the form of tetrabutyl titanate catalyst was introduced. The temperature was increased to 250° C. (rate of increase=1° C./min) and the vacuum re-applied. At this point, the majority of the 1,4-butanediol had been removed allowing the polycondensation reaction to proceed resulting in the formation of the PBT prepolymer. After 1 hour, the vacuum was removed and the temperature reduced to 230° C. 70 ppm of phosphoric acid was added together with 54 g "Pripol 1009" (dimer fatty acid) (ex Uniqema) and 32 g 1,4-butanediol (containing an additional 30 ppm of titanium), both under a positive flow of nitrogen. The temperature was further increased to 250° C. and the vacuum again re-applied. The reaction was monitored by observing the drop in the speed of the stirrer due to the increase in the viscosity of the evolving polymer. After 1 hour the desired melt viscosity has been reached, and the product was discharged, quenched into water and dried between 35 and 40° C. for up to 12 hours.

The hard segment, soft segment and block copolyester exhibited the following characteristics which were measured using the methods described herein:

Hard Segment
  (a) Tg=44° C.
  (b) Tm=225° C.
Soft Segment
  (a) Tg=−60° C.
Block Copolyester
  (a) Tg=−53.3° C.
  (b) Molecular Weight (Mn)=32,000
  (c) Tm=217.3° C.
  (d) Transesterification=45%

Example 2

(i) Synthesis of Dimer Fatty Acid Homopolymer 83 g of butane diol and 65 mg of tetrabutyl titanate catalyst were placed into a 500 ml round bottomed flask fitted with condenser, nitrogen flow and mechanical stirrer. The reactor was placed inside an isomantle and slowly heated to a temperature of 140° C. 183 g of "Pripol 1009" (dimer fatty acid) (ex Uniqema) was gradually added via a dropping funnel as the temperature was slowly increased to 160° C. After 80 mins, when the dimer fatty acid had been completely added, the temperature was increased to 180° C. As the reaction proceeded, water was removed using a Vigreux distillation column, condensed and collected in a separate flask. The reaction was stopped after 90 mins. The composition of the product was a mixture of dimer fatty acid/1,4-butanediol oligomer (89% w/w) and 1,4-butanediol (11% w/w). The mixture was placed into a glass tube reactor, heated to a temperature of 170° C. and mechanically stirred under nitrogen flow. Vaccum was steadily applied, and after 15 mins the temperature was increased to 190° C. and the reaction continued for another 20 mins to produce the dimer fatty acid homopolymer.

(ii) Synthesis of PET Hard Segment/Block Copolyester 100 g of bis-hydroxy ethylene terephthalate was placed into a columnar shaped reaction vessel fitted with a vacuum pump and nitrogen inlet, and heated to 260° C. The nitrogen flow was applied and 50 ppm of titanium in the form of tetrabutyl titanate catalyst was introduced. The nitrogen flow was stopped, and the vacuum steadily applied up to 1 mbar. The temperature was maintained at 260° C., and the ethylene glycol by-product was removed by the virtue of high vacuum, and collected in a cold trap. After 30 mins the vacuum was removed, the nitrogen re-applied, and 20 mg of phosphoric acid added. The temperature was increased to 290° C. at a rate of 1°/min and the vacuum re-applied. After 60 mins the vacuum was removed, 37 mg of cobalt(II) acetate tetrahydrate was introduced under nitrogen flow, and the vacuum again re-applied. After 30 mins, the vacuum was removed, nitrogen re-applied and 54 g of the dimer acid homopolymer produced above was added. The polymerisation reaction was carried out for a further 90 mins under high vacuum, the polymer was discharged, quenched into water and dried between 35 and 40° C. for up to 12 hours.

The hard segment, soft segment and block copolyester exhibited the following characteristics which were measured using the methods described herein:

Hard Segment
    (a) Tg=75° C.
    (b) Tm=251° C.

Soft Segment
    (a) Tg=−60° C.

Block Copolyester
    (a) Tg=−55° C.
    (b) Molecular Weight (Mn)=33,000
    (c) Tm=239° C.
    (d) Transesterification=45.6%

The above examples illustrate the improved properties of a block copolyester according to the present invention.

What is claimed is:

1. A block copolyester comprising a hard segment and a soft segment wherein the melting point of the copolyester is greater than or equal to 200° C., and the glass transition temperature of the copolyester is less than or equal to −40° C.

2. A copolyester according to claim 1 wherein the glass transition temperature of the copolyester is in the range from −70 to −45° C.

3. A copolyester according to claim 1 wherein the melting point of the copolyester is in the range from 210 to 265° C.

4. A copolyester according to claim 1 wherein the glass transition temperature of the copolyester is less than 20° C. higher than the glass transition temperature of the soft segment.

5. A copolyester according to claim 1 wherein the melting point of the copolyester is less than 20° C. lower than the melting point of the hard segment.

6. A copolyester according to claim 1 wherein the % transesterification is less than 75%.

7. A copolyester according to claim 1 wherein the soft segment is formed from at least one dimer fatty acid and/or dimer fatty diol and/or equivalent thereof.

8. A copolyester according to claim 1 wherein the hard segment is polybutylene terephthalate.

9. A block copolyester comprising a hard segment and a soft segment wherein the melting point of the copolyester is less than 20° C. lower than the melting point of the hard segment, and the glass transition temperature of the copolyester is less than 20° C. higher than the glass transition temperature of the soft segment.

10. A method of preparing a block copolyester as defined in claim 1 wherein the soft segment is formed in situ, in the presence of the preformed hard segment, and the same diol is used to form both the hard and soft segments.

* * * * *